(12) United States Patent
Rozhnov (10) Patent No.: US 11,151,581 B2
(45) Date of Patent: Oct. 19, 2021

(54) SYSTEM AND METHOD FOR BRAND PROTECTION BASED ON SEARCH RESULTS

(71) Applicant: GROUP-IB GLOBAL PRIVATE LIMITED, Singapore (SG)

(72) Inventor: Ilia Rozhnov, Singapore (SG)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 23 days.

(21) Appl. No.: 16/895,331

(22) Filed: Jun. 8, 2020

(65) Prior Publication Data

US 2021/0279743 A1 Sep. 9, 2021

(30) Foreign Application Priority Data

Mar. 4, 2020 (SG) .............................. 10202001963T (51) Int. Cl.
| | | |
|---|---|---|
| *G06Q 30/00* | (2012.01) | |
| *G06Q 30/02* | (2012.01) | |
| *G06F 16/953* | (2019.01) | |
| *G06Q 40/06* | (2012.01) | |

(52) U.S. Cl.
CPC ....... *G06Q 30/0185* (2013.01); *G06F 16/953* (2019.01); *G06Q 30/0256* (2013.01); *G06Q 40/06* (2013.01)

(58) Field of Classification Search
CPC ... G06Q 30/0185; G06Q 40/06; G06F 16/935
See application file for complete search history.

(56) References Cited

U.S. PATENT DOCUMENTS

| | | | |
|---|---|---|---|
| 7,225,343 | B1 | 5/2007 | Honig et al. |
| 7,457,725 | B1 | 11/2008 | Civilini |
| 7,496,628 | B2 | 2/2009 | Arnold et al. |
| 7,712,136 | B2 | 5/2010 | Sprosts et al. |
| 7,730,040 | B2 | 6/2010 | Reasor et al. |

(Continued)

FOREIGN PATENT DOCUMENTS

| | | |
|---|---|---|
| CN | 103491205 A | 1/2014 |
| CN | 103986731 A | 8/2014 |

(Continued)

OTHER PUBLICATIONS

English Abstract of RU 107616 retrieved on Espacenet on Jul. 3, 2017.

(Continued)

*Primary Examiner* — Alvin L Brown
(74) *Attorney, Agent, or Firm* — BCF LLP (57) ABSTRACT

A method of and a system for reducing access to a web resource are provided. The method comprises: receiving an information indicative of a brand to be protected; identifying a set of most popular search queries associated with the brand; acquiring a set of search results for at least one of the set of most popular search queries; calculating a harmfulness coefficient for at least one website contained in the set of search results; identifying the at least one website having the harmfulness coefficient exceeding a threshold value and defining it as a fraudulent website; generating an investment damage score for the fraudulent website; and causing execution of a brand protection measure against the fraudulent website in accordance with the investment damage score.

26 Claims, 6 Drawing Sheets

(56) References Cited

U.S. PATENT DOCUMENTS

| | | |
|---|---|---|
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,219,549 B2 | 7/2012 | Gao et al. |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,521,667 B2 | 8/2013 | Zhu et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,060,018 B1 | 6/2015 | Yu et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,300,686 B2 | 3/2016 | Pidathala et al. |
| 9,330,258 B1 | 5/2016 | Satish et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0037314 A1 | 2/2010 | Perdisci et al. |
| 2010/0076857 A1 | 3/2010 | Deo et al. |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0228636 A1 | 9/2010 | Silverman et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2017/0034211 A1 | 2/2017 | Buergi et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramacheneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0207973 A1 | 7/2019 | Peng |
| 2020/0134702 A1 | 4/2020 | Li |

FOREIGN PATENT DOCUMENTS

| | | |
|---|---|---|
| CN | 104504307 A | 4/2015 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| CN | 108737423 A | 11/2018 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |

(56) References Cited

FOREIGN PATENT DOCUMENTS

| | | |
|---|---|---|
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2676247 C1 | 12/2018 |
| RU | 2681699 C1 | 3/2019 |
| RU | 2697925 C1 | 8/2019 |
| RU | 2701040 C1 | 9/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU 164629 retrieved on Espacenet on Sep. 11, 2017.
English Abstract of RU2538292 retrieved on Espacenet on Sep. 18, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No .10201901079U.
Invitation to Respond to Written Opinion dated Jul. 31, 2019 with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 16, 2019.
English Abstract of KR10-1514984 retrieved on Espacenet on Oct. 15, 2019.
Office Action with regard to the counterpart U.S. Appl. No. 15/707,641 dated Apr. 25, 2019.
European Search Report with regard to the counterpart EP Patent Application No. EP17210904 completed May 16, 2018.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year 2005)—Notice of Allowance with regard to the counterpart U.S. Appl. No. 15/707,641.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN 104504307 retrieved on Espacenet on Jan. 7, 2020.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to the counterpart U.S. Appl. No. 16/270,341 dated May 27, 2020.
Search Report with regard to the counterpart RU Patent Application No. 2020127038 dated Sep. 29, 2020.
English Abstract for CN108737423 retrieved on Espacenet on Nov. 4, 2020.
English Abstract for CN 103986731 retrieved on Espacenet on Nov. 4, 2020.
Search Report with regard to the counterpart RU Patent Application No. 2020113308 dated Jul. 17, 2020.
Notice of Allowance with regard to the counterpart U.S. Appl. No. 15/858,032 dated Jul. 30, 2020.

SYSTEM AND METHOD FOR BRAND PROTECTION BASED ON SEARCH RESULTS

CROSS-REFERENCE

The present application claims priority to Singaporean Patent Application No. 10202001963T, entitled "SYSTEM AND METHOD FOR BRAND PROTECTION BASED ON THE SEARCH RESULTS" filed on Mar. 4, 2020, the entirety of which is incorporated herein by reference.

The present technology relates to the field of brand protection based on the search results.

BACKGROUND

Generally, a brand is understood as an identification mark of a product, for example, a name, a specific sign/symbol, term, color, image, sound or a combination thereof, which are designed to differentiate a given product (service) from competitor's products (services).

Many companies and commercial organizations make significant investments in brand development and maintaining high quality of their brand-related products. Branding represents methods designed to impress, which contributes to the overall image and the target market segment attitude towards the brand. At any given time, any brand has a certain image (Brand Image), which represents a unique set of associations that are currently in the minds of consumers. These associations express what the brand means right now and represent an immediate promise to consumers given by brand owners.

However, a higher popularity of a given brand may be associated with an increased risk of unauthorized use thereof including Internet scamming, online piracy, and producing and distributing counterfeit goods, to name a few, which may affect market reputation of products known by the given brand.

The consequences of these activities can cause both material and non-material damage to the brand owners. For example, violators can use a fraudulent website containing a brand name of the given brand owned by Company A to sell their products, usually of a lower quality than original products of the Company A marketed under the given brand. Therefore, Company A may incur material losses caused by such activities of the violators, which may include, for example, an associated outflow of funds. Further, such activities may cause non-material damage to Company A, such as a decrease in credibility thereto, and the given brand being compromised in the eyes of current and potential consumers of Company A.

Therefore, the matter of brand protection against unauthorized use is particularly relevant nowadays. Certain prior art approaches have been proposed to address the above-identified technical problem.

US Patent Application Publication No. 2016/0253679-A1 published on Sep. 1, 2016, assigned to THOMSON REUTERS GLOBAL RESOURCES, and entitled "*Brand Abuse Monitoring System with Infringement Detection Engine and Graphical User Interface*" discloses a computer-based system connected to a remote user device and a plurality of services. A data collection engine having an input adapted to receive a set of collection data from a set of services, the set of collection data comprising a set of brand data for comparison against a control set of data stored in a database and having a set of fields and via the digital communications network a query. An entity identification module identifies and extracts within the set of collection data a set of entity data, compares the set of entity data against a set of entity control data to resolve entity identification, associates an entity identifier with the identified entity, and determines a set of relationship data between entities; a matching module adapted to receive data derived from the set of collection data and compare the received data against a set of known brand data and generate a set of comparison data and an output indicating a presence of a match; a scoring module adapted to generate a set of score data based on the set of comparison data. A graphic user interface presents a graphic representation of the set of scored data on a display device.

U.S. Pat. No. 8,285,830-B1 issued on Oct. 9, 2012, assigned to Citizenhawk Inc, and entitled "*System and Method for Combating Cybersquatting*" discloses a computer-implemented method for combating cybersquatting is provided. The method may comprise receiving a trademark to be monitored for potential typosquatting and generating a list of one or more typo domains for the trademark. The method then collects data associated with the one or more typo domains and prepares a document that includes a subset of the domains with their associated collected data for submission to an administrative agency handling domain disputes.

US Patent Application Publication No. 2016/0055490-A1, published on Feb. 25, 2016, assigned to BRANDSHIELD Ltd, and entitled "*Device, System, and Method of Protecting Brand Names and Domain Names*" discloses a computerized method of protecting a brand name of a brand owner, includes: (a) crawling a global communication network to identify and collect data about web-sites that possibly abuse the brand name; (b) for each web-site that possibly abuses the brand name, analyzing whether or not the web-site abuses the brand name by analyzing at least one of: (i) content of the web-site; and (ii) data about an owner of the web-site. The method further includes: for each web-site that possibly abuses the brand name, (A) generating an investment score indicating an estimated level of investment that was invested in development of the web-site; and (B) generating a damage score indicating a level of damage that the web-site is estimated to produce to the brand name.

SUMMARY

It is an object of the present technology to ameliorate at least some of the inconveniences present in the prior art.

Developers of the present technology have realized that the prior art approaches do not appear to allow for quickly responding to an unauthorized use of the given brand.

Thus, the developers have devised systems and methods directed to identifying fraudulent websites and reducing access thereto based on analyzing search results generated in response to popular search queries obtained from one or more search engine systems (such as Yandex™ search engine system, Google™ search engine system, and the like). This enables to access the most up-to-date data for assessing damage and losses incurred to the given brand by the activities of the violators using one or more fraudulent websites.

Therefore, in accordance with a first broad aspect of the present technology, there is provided a method of reducing access to a web resource. The method is executable by a computing device. The method comprises: receiving an information indicative of a brand to be protected; accessing a search system database to identify a set of most popular search queries associated with the brand in the search system database, the set of most popular search queries being indicative of past queries submitted to an electronic search system associated with the search system database; acquiring a set of search results for at least one of the set of most popular search queries, the set of search results generated over a pre-determined assessment period; calculating a harmfulness coefficient for at least one website contained in the set of search results; identifying the at least one website having the harmfulness coefficient exceeding a threshold value and defining it as a fraudulent website; generating an investment damage score for the fraudulent website over the pre-determined assessment period; and causing execution of a brand protection measure against the fraudulent website in accordance with the investment damage score.

In some implementations of the method, identifying the set of most popular search queries further comprises analyzing search query statistics obtained from the electronic search system.

In some implementations of the method, the acquiring the set of search results further comprises taking a snapshot thereof, the snapshot being representative of snapshot data, the snapshot data including at least a rank value of the at least one website indicative of its position within the set of search results.

In some implementations of the method, in the snapshot data of the set of search results is represented by a table containing at least, for the at least one website, the rank value, a link to the at least one website, a title and a description of the link, and information of the computing device, the information of the computing device including information of a location thereof.

In some implementations of the method, the snapshot data further includes data of contextual advertising associated with the set of search results acquired by at least one external remote computing device.

In some implementations of the method, the snapshot data further includes data of contextual advertising associated with the at least one of the set of most popular search queries.

In some implementations of the method, the harmfulness coefficient is calculated according to a formula: $R=1-\Pi_i(1-w_i)$, where R is the harmfulness coefficient and wi is a weight associated with a respective one of a plurality of harmfulness indications associated with the at least one website.

In some implementations of the method, the plurality of harmfulness indications includes at least one of: a presence of a domain associated with the at least one website in a list of legitimate or illegitimate domains; a popularity value associated with the at least one website; a presence of the domain associated with the at least one website in a list of fraudulent domains; an absence of a security certificate; a life time of the domain associated with the website; data indicative of using of website builders for creating the at least one website; a number of webpages, which the at least one website includes; a presence, at the at least one website, of one of a web registration form and a web payment form; a category of an owner of the domain associated with the at least one website including one of: a private person, a legal entity, and hidden; a cost of hosting associated with the at least one website; a domain zone; a country associated with a hosting provider of the at least one website; and a relevance value associated with the at least one website.

In some implementations of the method, the investment damage score over the pre-determined assessment period is generated based on multiplying one of: an average purchase amount associated with the brand at the fraudulent website; a conversion rate associated with the fraudulent website, and a number of visitors to the fraudulent website over the pre-determined assessment period.

In some implementations of the method, a calculation of the number of visitors to the fraudulent website is based on the snapshot data, the calculation comprising summing visitors to the fraudulent website over the pre-determined assessment period.

In some implementations of the method, the summing the visitors to the fraudulent website is based on one of: a statistical number of transitions to a position of the fraudulent website in the set of search results and a number of search queries associated with the fraudulent website.

In some implementations of the method, the statistical number of transitions to the position of the fraudulent website in the set of search results is calculated based at least on one of: a formula: $y=CONST1 x^{-CONST2}$, where y is the conversion rate associated with the fraudulent website, x is the position of the fraudulent website in the set of search results, and CONST1 and CONST2 are constant values determined based on the information indicative of the brand and data indicative of a probability of click associated with the position of the fraudulent website obtained from the search system over the pre-determined assessment period; and data available from an access counter present at the fraudulent website.

In some implementations of the method, the execution of the brand protection measure includes: blocking the fraudulent website; reducing the traffic to the fraudulent website; removing the fraudulent website from the set of search results; adding the fraudulent website into a database of fraudulent resources; accumulating evidence of fraudulent activities associated with the fraudulent website; identifying web resources affiliated with the fraudulent website; legal influence on the fraudulent website, including legal influence on an owner associated therewith; notifying customers and/or potential customers about the fraudulent website; and identifying affiliation of the fraudulent website with previously identified fraudulent websites.

In accordance with a second broad aspect of the present technology, there is provided a system for reducing access to a web resource. The system comprises a computing device. The computing device comprises: a processor; a non-transitory computer-readable medium comprising instructions. The processor, upon executing the instructions, is configured to: receive and store information indicative of a brand to be protected; access a search system database to identify a set of most popular search queries associated with the brand in the search system database, the set of most popular search queries being indicative of past queries submitted to a search system associated with the search system database; acquire a set of search results for at least one of the set of most popular search queries, the set of search results generated over a pre-determined assessment period; calculate a harmfulness coefficient for at least one website contained in the set of search results; in response the harmfulness coefficient exceeding a threshold value, identify the at least one website as a fraudulent website; generate an investment damage score for the fraudulent website over the pre-determined assessment period; and cause execution of a brand protection measure against the fraudulent website in accordance with the investment damage score.

In some implementations of the system, the processor is configured to identify the set of most popular search queries based on analyzing search query statistics obtained from the search system.

In some implementations of the system, the processor configured to acquire the set of search results is further configured to take a snapshot thereof, the snapshot being representative of snapshot data, the snapshot data including a rank value of the at least one website indicative of its position within the set of search results.

In some implementations of the system, the processor is configured to represent the snapshot data of the set of search results in a table containing at least, for the at least one website, the rank value, a link to the at least one website, a title and a description of the link, and information of the computing device, the information of the computing device including information of a location thereof.

In some implementations of the system, the processor is further configured to receive, from at least one external remote computing device, data of contextual advertising associated with the set of search results.

In some implementations of the system, the processor is further configured to receive data of contextual advertising associated with the at least one of the set of most popular search queries.

In some implementations of the system, the processor is configured to calculate the harmfulness coefficient according to a formula: $R=1-\Pi_i(1-w_i)$, where R is the harmfulness coefficient and wi is a weight associated with a respective one of a plurality of harmfulness indications associated with the at least one website.

In some implementations of the system, the plurality of harmfulness indications includes at least one of: a presence of a domain associated with the at least one website in a list of legal/illegal domains; a popularity value associated with the at least one website; a presence of the domain associated with the at least one website in a list of fraudulent domains; an absence of a security certificate; a life time of the domain associated with the website; data indicative of using of website builders for creating the at least one website; a number of webpages, which the at least one website includes; a presence, at the at least one website, of one of a web registration form and a web payment form; a category of an owner of the domain associated with the at least one website including one of: a private person, a legal entity, hidden; a cost of hosting associated with the at least one website; a domain zone; a country associated with a hosting provider of the at least one website; and a relevance value associated with the at least one website.

In some implementations of the system, the processor is configured to generate the investment damage score by multiplying one of: an average purchase amount associated with the brand at the fraudulent website; a conversion rate associated with the fraudulent web site, and a number of visitors to the fraudulent website over the pre-determined assessment period.

In some implementations of the system, the processor is configured to calculate of the number of visitors to the fraudulent website based on the snapshot data, the calculating comprising summing visitors of the fraudulent website over the pre-determined assessment period.

In some implementations of the system, the summing the visitors to the fraudulent website is based on one of: a statistical number of transitions to a position of the fraudulent website in the set of search results and a number of search queries associated with fraudulent website.

In some implementations of the system, the statistical number of transitions to the position of the fraudulent website in the set of search results is calculated based at least on one of: a formula: $y=CONST1 x^{-CONST2}$, where y is the conversion rate associated with the fraudulent website, x is the position of the fraudulent website in the set of search results, and CONST1 and CONST2 are constant values determined based on the information indicative of the brand and data indicative of a probability of click associated with the position of the fraudulent website obtained from the search system over the pre-determined assessment period; and data available from an access counter present at the fraudulent website.

In some implementations of the system, in order to cause execution of the brand protection measure, the processor is configured to execute at least one of: blocking the fraudulent website; reducing the traffic to the fraudulent website; removing the fraudulent website from the set of search results; adding the fraudulent website into a database of fraudulent resources; accumulating evidence of fraudulent activities associated with the fraudulent website; identifying web resources affiliated with the fraudulent website; legal influence on the fraudulent website, including influence on its owner; notifying customers and/or potential customers about the fraudulent website; and identifying affiliation of the fraudulent website with previously identified fraudulent websites.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, terms "computing device" and "electronic device" should be considered synonymous and denote any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

BRIEF DESCRIPTION OF THE ATTACHED FIGURES

These and other features, aspects and advantages of the present technology will become better understood with regard to the following description, appended claims and accompanying drawings where:

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

Certain non-limiting embodiments of the present technology are directed to systems and methods for identifying a fraudulent web resource based on analyzing search results and reducing access thereto. Specifically, certain non-limiting embodiments of the present technology enable to timely identify websites, activities of which cause the most damage to the given brand for a predetermined period (also, referred to herein as an "assessment period"), as well as to counteract, or otherwise, avert any further damage to the given brand caused by these harmful activities.

Figure 1:
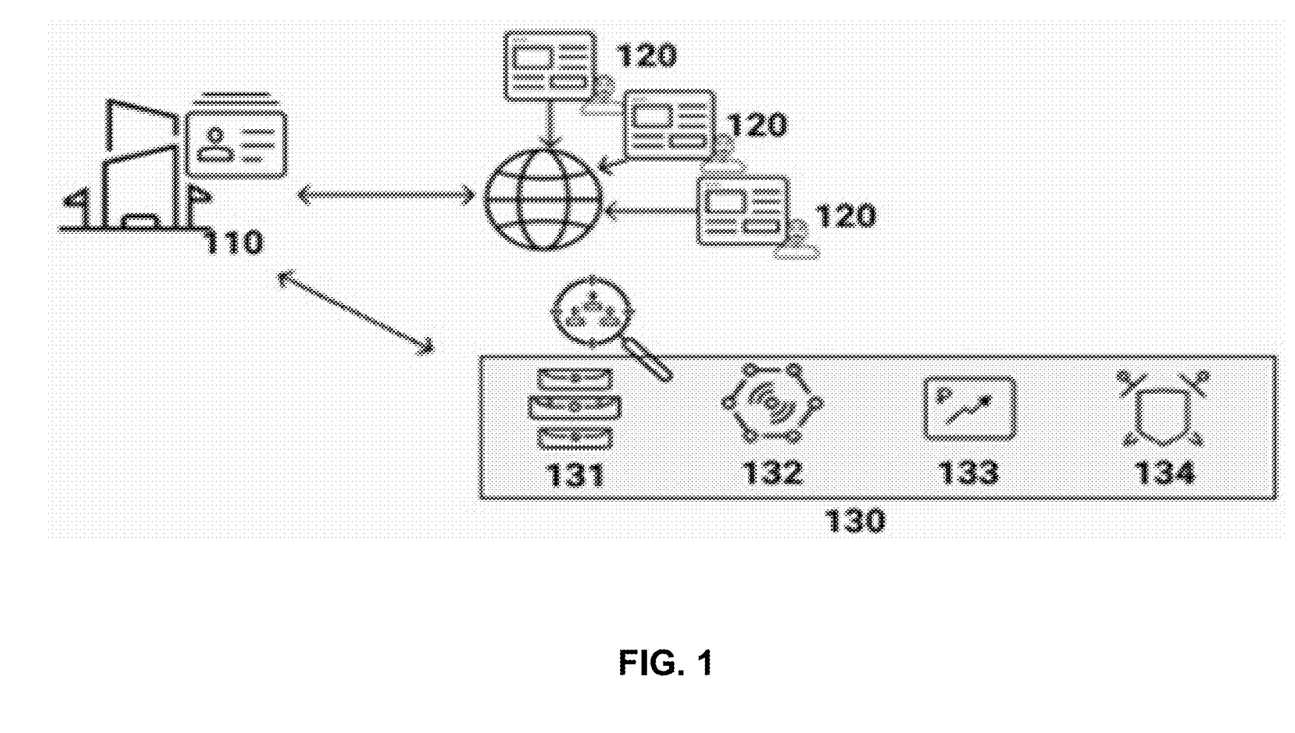
FIG. 1 depicts a schematic diagram of an example computer system for implementing certain embodiments of system and/or method of the present technology.

Referring initially to FIG. 1, there is depicted a schematic diagram of a computer system 130 suitable for implementing certain non-limiting embodiments of the present technology.

According to the non-limiting embodiments of the present technology, the computer system 130 may include: a data collection module 131; a harmfulness analysis module 132; a damage assessment module 133; a brand protection module 134, configuration and functionality of which will now be described below According to certain non-limiting embodiments of the present technology, the data collection module 131 may be configured to receive and save information of a brand to be protected (such as a brand 110) in an internal database (not depicted) of the computer system 130.

According to certain non-limiting embodiments of the present technology, the information of the brand 110 may include, without being limited to, at least one of: a brand name; a list of official brand-related web resources (such as domains, social networks); a list of official web resources of partners of the brand 110; an average customer purchase amount spent on products associated with the brand 110; a list of countries where the brand 110 is present (that is, a coverage of the brand 110); a target audience language; data on possible seasonal changes in a demand for at least some of the products associated with the brand 110; conversion rates for the products associated with the brand 110; a list of fraudulent web resources known to target the brand 110; data indicative of traffic to an official web resource associated with the brand 110; data indicative of distribution of types of electronic devices (mobile phone, computer, tablet) using which the official web resource has been visited; a start and an end of the assessment period.

According to certain non-limiting embodiments of the present technology, the data collection module 131 may be configured to have access to at least one of a plurality of search engine services providing statistical data about most popular search queries associated with the brand 110 in real time (for example, WordStat™ by Yandex™ search engine system, Google.AdWords™ by Google™ search engine system, etc.) and further to save so obtained statistical data in the internal database (not depicted) of the computer system 130.

Further, based on the so obtained statistical data and using the associated search queries, the data collection module 131 may be configured to scan the Internet (or any other network, such as an Intranet implemented based on LAN/WAN technologies, for example) to retrieve and store search results 120 over the assessment period for which a damage for the brand 110 is to be assessed.

In some non-limiting embodiments of the present technology, at least one external electronic device (not depicted) may be coupled to the computer system 130 for retrieving the search results 120. Moreover, in some non-limiting embodiments of the present technology, a software component responsible for scanning the Internet to retrieve and store the search results 120 may be delivered at the at least one external electronic device in a Docker container. In specific non-limiting embodiments of the present technologies, the at least one external electronic device can be one of a stationary device (for example, a desktop computer, a workstation, or an IoT device) and a mobile device (for example, a smartphone, a tablet, or a laptop). It should be expressly understood that the at least one external electronic devices can be coupled to the computer system 130 through direct channels and/or one or more networks or other common channels including, but not being limited to, the Internet, intranets and other networks, using wired and/or wireless communication lines (such as Wi-Fi or 3G/4G communication lines).

With reference to FIGS. 3A to 3D, according to some non-limiting embodiments of the present technology, the data collection module 131 may be configured to take a snapshot 302 of the search results 120. Further, the data collection 131 module may be configured to save the snapshot 302 in the internal database in a form of a table for each of the search query. This table may contain at least some of the following data, for each of the search results 120: a position thereof within the search results 120, an associated link, a title and a description of the link, information about an electronic device from which the snapshot 302 has been taken, date/time of taking the snapshot 302, a location of the electronic device from which the snapshot 302 has been taken snapshot 302, and a search engine system used to generate the search results 120.

According to the non-limiting embodiments of the present technology, the harmfulness analysis module 132 may be configured to (1) calculate a harmfulness coefficient for a given one of the search results 120 (or at least one website thereunder) associated with the brand 110 based on a plurality of harmfulness indications predefined in the computer system 130; (2) compare the harmfulness coefficient with a predetermined threshold value; and (3) in response to the harmfulness coefficient exceeding the predetermined threshold value, identify the given one of the search results 120 to be a fraudulent web resource.

Further, according to the non-limiting embodiments of the present technology, the damage assessment module 133 may be configured to determine an investment damage score indicative of the damage caused to the brand 110 by the fraudulent web resource over the assessment period. In some non-limiting embodiments of the present technology, the damage assessment module 133 may be configured to rank the fraudulent web resource (within other so identified fraudulent web resources associated with the brand 110) based on the investment damage score.

According to the non-limiting embodiments of the present technology, the brand protection module 134 may be configured to take a brand protection measure to protect the brand 110 based at least on data so retrieved and generated by at least one of the data collection module 131, the harmfulness analysis module 132, and the damage assessment module 133. Thus, the brand protection measure may include, but not being limited to: blocking the fraudulent web resource; reducing traffic to the fraudulent web resource; removing the fraudulent web resource from the search results 120; adding the fraudulent web resource into the list of fraudulent web resources known to target the brand 110; accumulating evidence of fraudulent activities associated with the fraudulent web resource; identifying web resources affiliated with the fraudulent web resource; legal influence on the fraudulent web resource, including legal influence on an owner associated therewith; notifying customers and/or potential customers about the fraudulent web resource; and identifying affiliation of the fraudulent web resource with previously identified fraudulent websites.

It should be expressly understood that functional capabilities attributed to the computer system 130 can be distributed among its components in an alternative way, for example, by combining or further separating the functions of one or more components (such as the data collection module 131, the harmfulness analysis module 132, the damage assessment module 133, and the brand protection module 134), or can be distributed among another combination of components. In addition, although the data collection module 131, the harmfulness analysis module 132, the damage assessment module 133, and the brand protection module 134 are depicted as separate hardware components, they can be alternatively implemented as separate software modules running on one or several computer servers. Therefore, although only one variant of each component is depicted in FIG. 1, it should be understood that other combinations of the components of the computer system 130 can be used.

Figure 2:
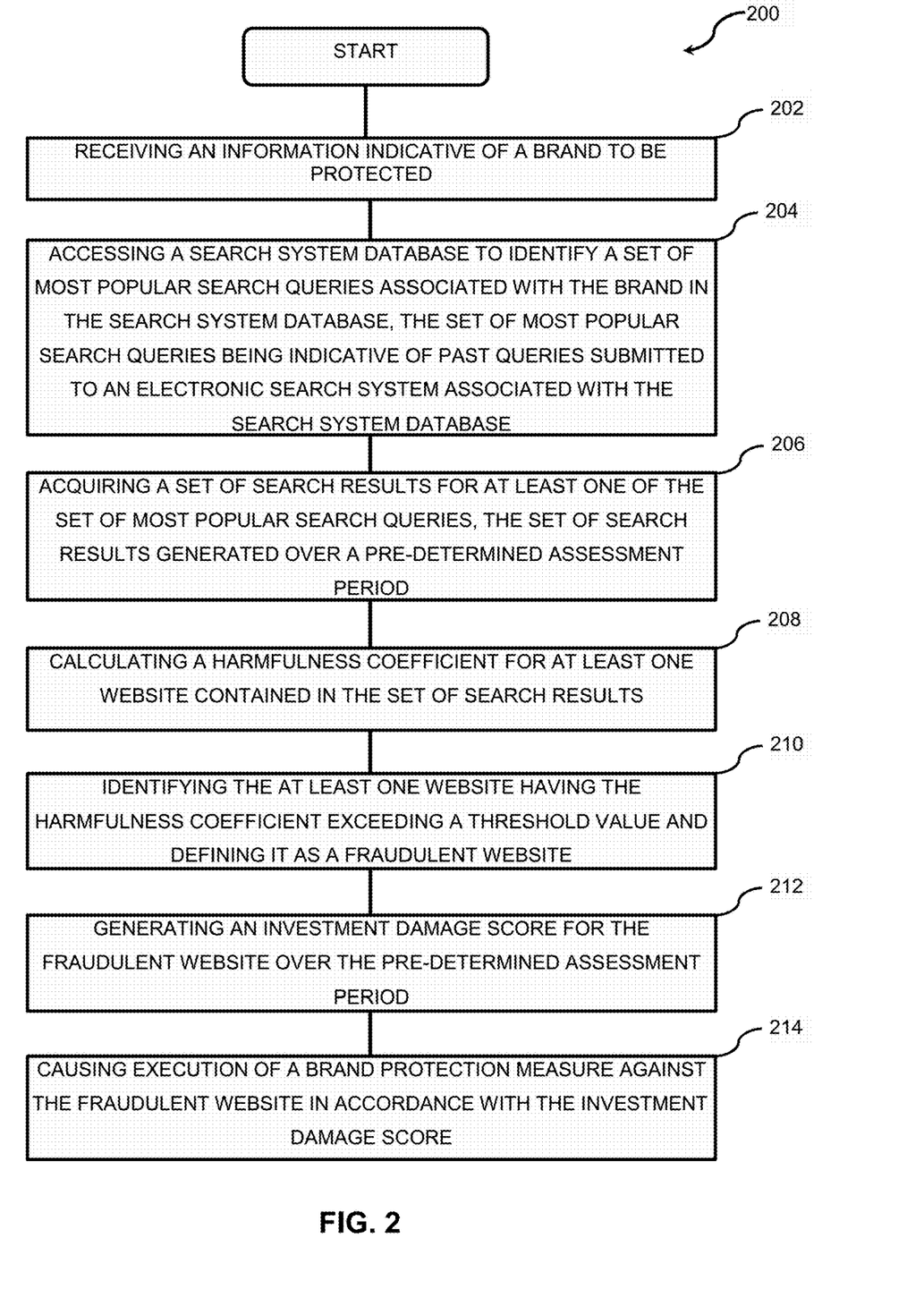
FIG. 2 depicts a flowchart of a method for reducing access to a web resources, the method being executed by the computer system of FIG. 1, in accordance with certain non-limiting embodiments of the present technology.
Figure 3A:
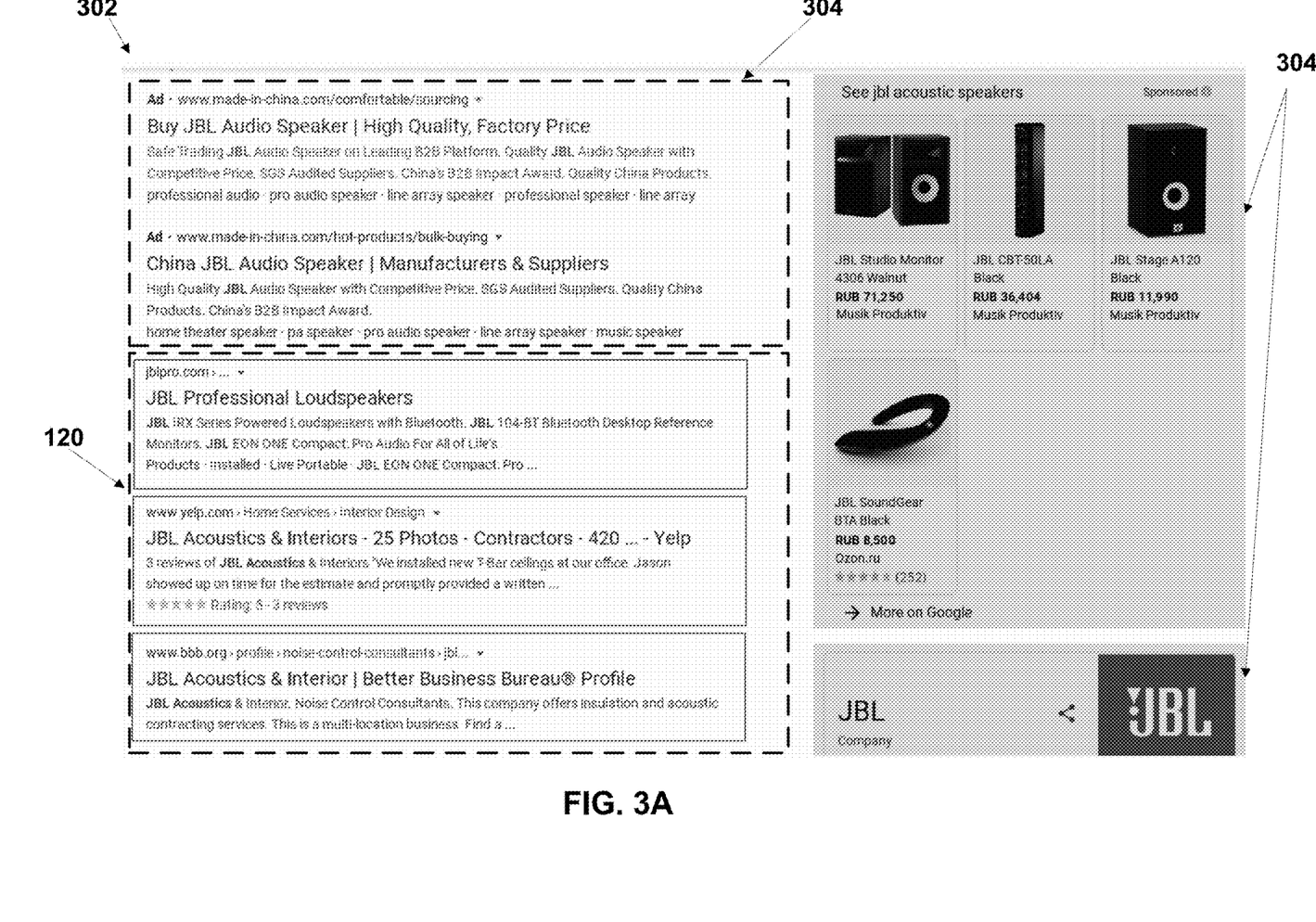
FIGS. 3A to 3B depict schematic diagrams of a snapshot of search results taken by the system of FIG. 1 and associated areas of interest therein, respectively, in accordance with some non-limiting embodiments of the present technology where the system of FIG. 1 is implemented based on a stationary electronic device.
Figure 3B:
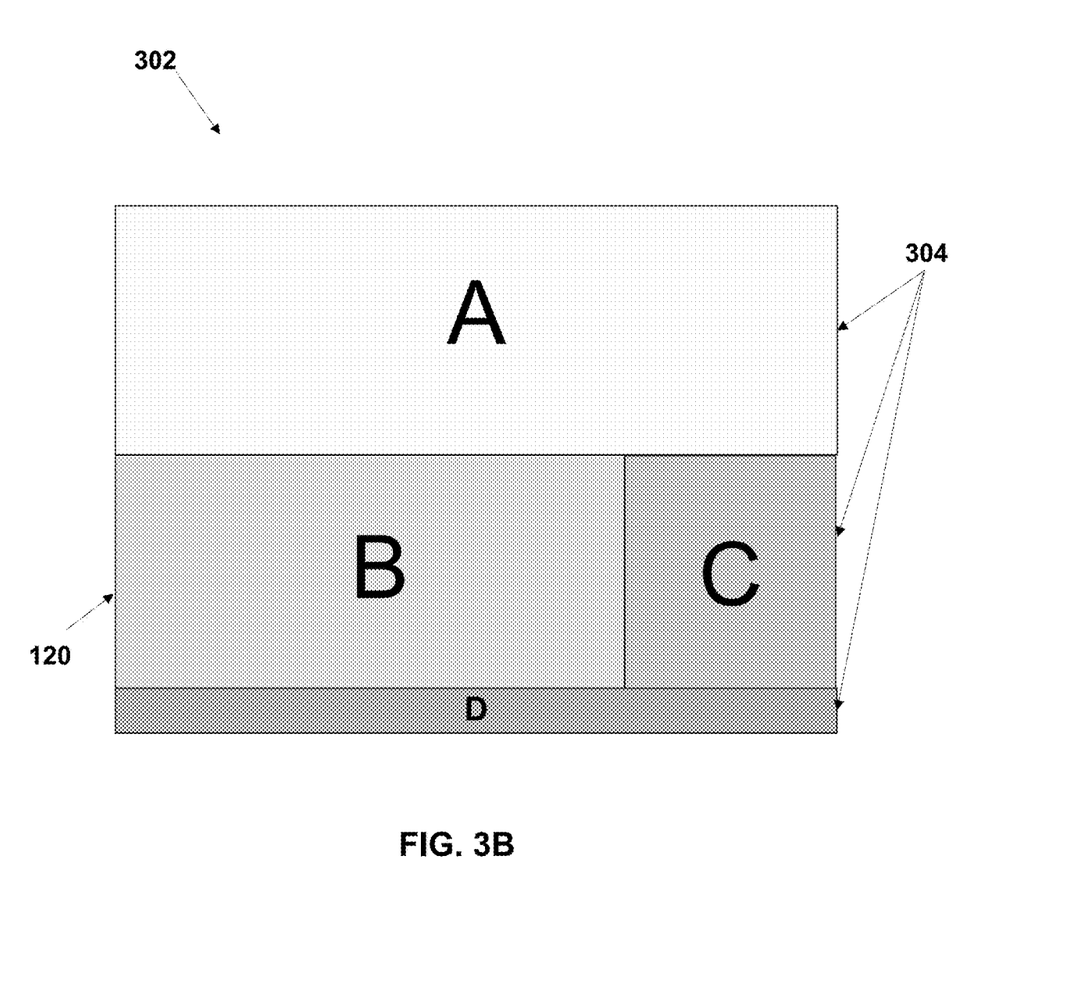
Figure 3C:
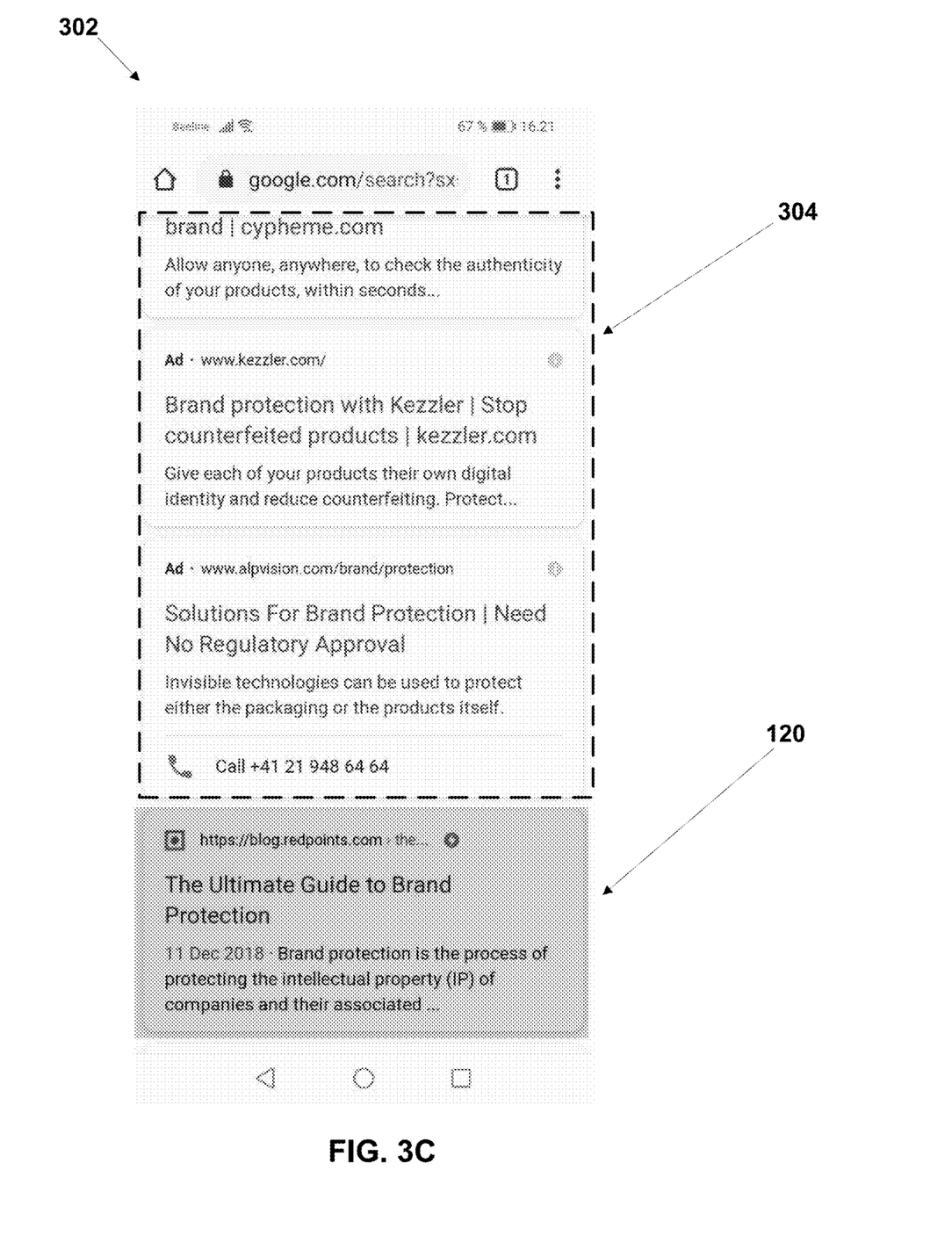
FIGS. 3C to 3D depict schematic diagrams of a snapshot of search results taken by the system of FIG. 1 and associated areas of interest therein, respectively, in accordance with some non-limiting embodiments of the present technology where the system of FIG. 1 is implemented based on a mobile electronic device.
Figure 3D:
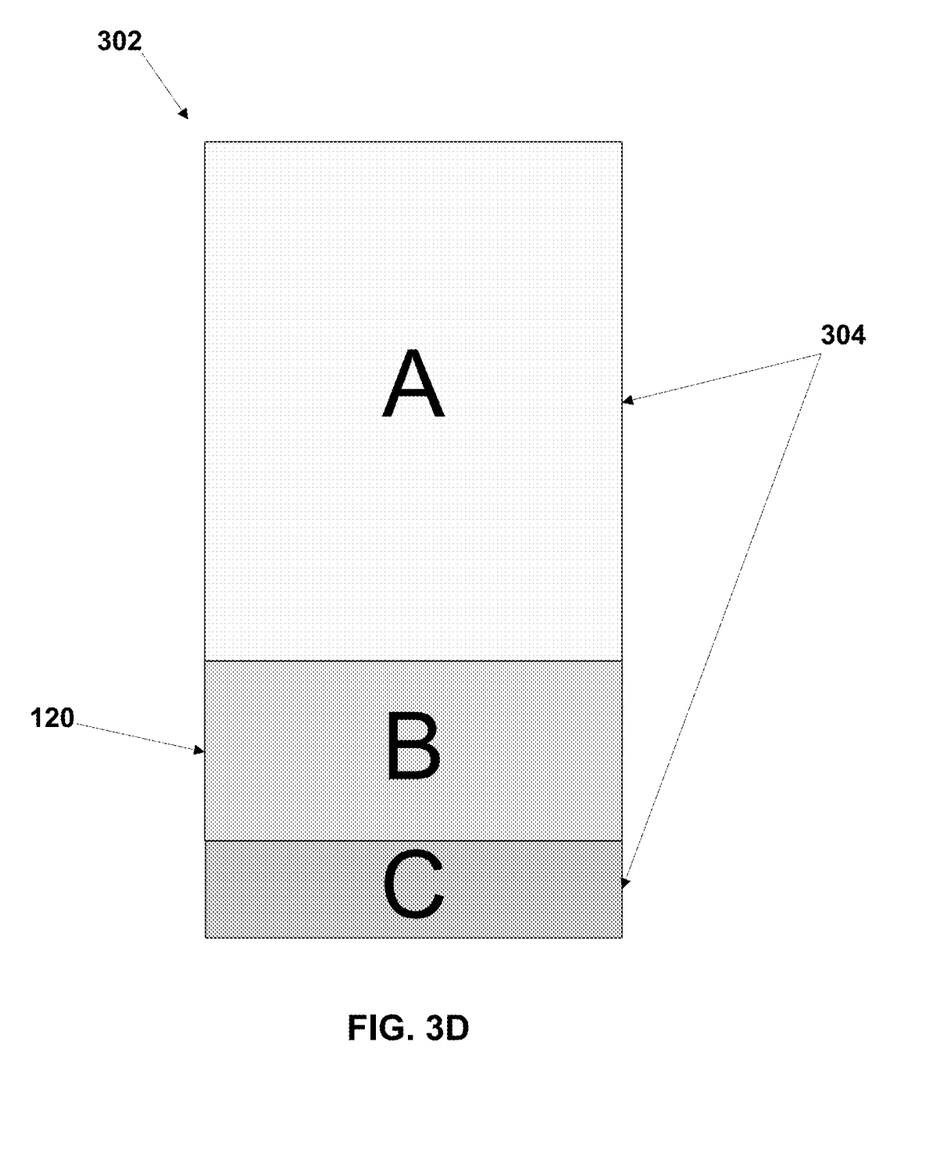

With reference to FIG. 2, there is depicted a flowchart of a method 200 for reducing access to a web resource based on analyzing search results, in accordance with some non-limiting embodiments of the present technology. In other non-limiting embodiments of the present technology, one or several illustrated steps may be omitted, repeated and/or performed in a different order. Therefore, a specific arrangement of the steps depicted in FIG. 2 should not be considered as a limitation of the scope of the present technology. The method 200 may be executed by the computer system 130.

Step 202: Receiving an Information Indicative of a Brand to be Protected

As previously mentioned according to certain non-limiting embodiments of the present technology, first, the data collection module 131 may be configured to retrieve information of the brand 110, which may include, without being limited to, at least one of: a brand name; a list of official brand-related web resources (such as domains, social networks); a list of official web resources of partners of the brand 110; an average customer purchase amount of products associated with the brand 110; a list of countries where the brand 110 is present (that is, a coverage of the brand 110); a target audience language; data on possible seasonal changes in a demand for at least some of the products associated with the brand 110; conversion rates for the products associated with the brand 110; a list of fraudulent web resources known to target the brand 110; data indicative of traffic of an official web resource associated with the brand 110; data indicative of distribution of types of electronic devices (mobile phone, computer, tablet) using which the official web resource has been visited; a start and an end of the assessment period.

In some non-limiting embodiments of the present technology, the data indicative of traffic of the official web resource associated with the brand 110 may comprise statistical data indicative of a number of visitors to the official web resource over a predetermined time interval (such as one hour, one day, and the like). In these embodiments, the statistical data may be generated and provided by one or more website analytics services, such as, but not being limited to, Yandex.Metrika™ by Yandex™ search engine system, LiveInternet™ website analytics service, and Google Analytics™ by Google™ search engine system. In other non-limiting embodiments of the present technology, the statistical data may be provided by the owner of the brand 110 based on internal website analytics of the number of visitors to the official web resource associated with the brand 110.

Step 204: Accessing a Search System Database to Identify a Set of Most Popular Search Queries Associated with the Brand in the Search System Database, the Set of Most Popular Search Queries being Indicative of Past Queries Submitted to an Electronic Search System Associated with the Search System Database At step 204, a set of most popular search queries associated with the brand 110 in a given search engine system can be identified. According to some non-limiting embodiments of the present technology, the set of most popular search queries may comprise, for example, past search queries having been submitted to the given search engine system over a predetermined period. In other non-limiting embodiments of the present technology, the set of most popular search queries may comprise most frequent search queries having been submitted to the given search engine system over a predetermined period, such as the assessment period.

To that end, according to certain non-limiting embodiments of the present technology, the computer system 130 may be configured to have access to at least one of the plurality of search engine services (such as WordStat™ by Yandex™ search engine system, Google.AdWords™, GoogleTrends™ by Google™ search engine system, and the like), whereby the computer system 130 may further be configured to obtain statistical data associated with the set of most popular search queries associated with the brand 110.

It should be understood that the statistical data associated with the set of most popular search queries can be location-specific statistical data, since search results (such as the search results 120) generated in response to a given search query may differ depending on a country, a language, and a time of day of submitting the given search query.

Additionally, in some non-limiting embodiments of the present technology, the statistical data may further include data on contextual advertising received, along with the search results 120, in response to the submitting the given search query. This data may further be saved in the internal database of the computer system 130 in association with the brand 110.

According to certain non-limiting embodiments of the present technology, the given one of the set of most popular search queries may include at least the brand name of the brand 110. Further, the given one of the set of most popular search queries may also include at least one of: one more relevant words, various combinations of relevant words; relevant search terms, the relevant terms that do not include the brand name, and the like.

In certain non-limiting embodiments of the present technology, the statistical data associated with the set of most popular search queries may be received by the computer system 130 as input data.

Step 206: Acquiring a Set of Search Results for at Least one of the Set of Most Popular Search Queries, the Set of Search Results Generated Over a Pre-Determined Assessment Period At step 206, the computer system 130 may be configured to receive a set of search results, such as the search results 120, in response to submitting the given one of the set of most popular search queries.

Further, as previously mentioned, according to some non-limiting embodiments of the present technology, the computer system 130 may be configured to take the snapshot 302 of the search results 120.

For example, the snapshot 302 of the search results 120 may be taken daily. Alternatively, the snapshot 302 may be taken at another frequency during the assessment period.

According to some non-limiting embodiments of the present technology, the snapshot 302 of the search results 120 may additionally include contextual advertising 304 associated with the brand 110. Referring back to FIGS. 3A to 3D, fields A, C, D contain the contextual advertising 304, and field B contains the search results 120. For the purpose of a better data representation, data indicative of contextual advertising 304 may be received from various locations, as well as from various electronic devices.

In addition, in one embodiment of this technique, the snapshot 302 may be received from the at least one external electronic device (not depicted) communicatively coupled to the computer system 130. Accordingly, the software component for generating the snapshot 302 may be delivered to the at least one external electronic device in a Docker container. Thus, the at least one external electronic device may be configured to transmit the snapshot 302 of the search results 120 to the computer system 130.

Further, according to some non-limiting embodiments of the present technology, the snapshot 302 may be saved into the internal database in the form of a table for each of the set of most popular queries identified at step 204. This table may contain at least some of the following data, for each of the search results 120: the position thereof within the search results 120, the position being indicative of a rank value of a given one of the search results 120 therein; an associated link; a title and a description of the link; information about an electronic device from which the snapshot 302 has been taken; date/time of taking the snapshot 302; a location of the electronic device from which the snapshot 302 has been taken snapshot 302; and a search engine system used to generate the search results 120.

The method 200 thus advances to step 208

Step 208: Calculating a Harmfulness Coefficient for at Least One Website Contained in the Set of Search Results According to the non-limiting embodiments of the present technology, at step 208, the computer system 130 may be configured to calculate the harmfulness coefficient for a given one of the search results 120. According to some non-limiting embodiments of the present utility model, the given one of the search results 120 may include at least one website.

According to some non-limiting embodiments of the present technology, the harmfulness coefficient for the at least one website may be calculated according to the formula:

$$R = 1 - \Pi_i(1 - w_i), \quad (1)$$

where R is the harmfulness coefficient; and
and $w_i$ is a weight associated with a respective one of the plurality of harmfulness indications associated with the at least one website.

According to some non-limiting embodiments of the present technology, the plurality of harmfulness indications associated with the at least one website may include at least one of the following:
- a presence of a domain associated with the at least one website in a list of legitimate or illegitimate domains (provided, for example, by The Internet Corporation for Assigned Names and Numbers, ICANN);
- a popularity value associated with the at least one website, which may be calculated based on the statistical data;
- a presence of the domain associated with the at least one website in a list of fraudulent domains;
- an absence of a security certificate;
- a life time of the domain associated with the at least one website;
- data indicative of using of website builders (such as WordPress™, Gator™, and the like) for creating the at least one website;
- a number of webpages, which the at least one website includes;
- a presence, at the at least one website, of one of a web registration form and a web payment form;
- a category of an owner of the domain associated with the at least one website including one of: a private person, a legal entity, and hidden;
- a cost of hosting associated with the at least one website;
- a domain zone;
- a country associated with a hosting provider of the at least one website; and
- a relevance value associated with the at least one website to the given one of the set of most popular search queries.

It should be noted that values of the at least some of the plurality of harmfulness indications may be determined, for example, based at least on information obtained from (1) registration data of the domain associated with the at least one website; (2) information about an IP address of the at least one website; (3) public databases with information about the at least one website; (4) direct analysis of contents of the at least one website; and (5) information about a hosting provider associated with the domain and obtained, for example, from official sources.

Further, in some non-limiting of the present technology, the weight $w_i$ associated with the respective one of the plurality of harmfulness indications may be determined by experts. In other non-limiting embodiments of the present technology, the weight $w_i$ may be determined by the computer system 130 executing a machine-learning algorithm (MLA) that has been trained based on data having previously been accumulated by the computer system 130.

It should be noted that the weight $w_i$ associated with the respective one of the plurality of harmfulness indications may further be changed depending on certain parameters associated with the brand 110, such as its category and country, as well as the information indicative thereof supplied into the computer system 130 at step 202.

The method 200 thus advances to step 210.

Step 210: Identifying the at Least One Website Having the Harmfulness Coefficient Exceeding a Threshold Value and Defining it as a Fraudulent Website Further, at step 210, the computer system 130 may be configured to compare the harmfulness coefficient R of the at least one website the predetermined threshold value $R_0$.

For example, if the harmfulness coefficient R associated with the at least one website is equal or above the predetermined threshold value $R_0$, the computer system 130 may be configured to identify the at least one website as a fraudulent web resource. On the other hand, if the computer system 130 has determined that the harmfulness coefficient R associated with the at least one website is below the predetermined threshold value $R_0$, the computer system 130 may proceed to examine an other one of the search results 120.

According to some non-limiting embodiments of the present technology, the fraudulent web resource may comprise at least one of:
- a phishing website;
- a website that distributes illegitimate copies of products (including counterfeit);
- a website that illegally uses brands or intellectual property (including trademarks);
- a fake online shop;
- an unofficial copy of a legal web resource;
- a website distributing malware; and a website leading (containing links or redirecting) to other websites of any of the above categories.

The method 200 thus advances to step 212.

Step 212: Generating an Investment Damage Score for the Fraudulent Website Over the Pre-Determined Assessment Period At step 212, according to some non-limiting embodiments of the present technology, the computer system 130 may be configured to determine the investment damage score for the brand 110 over the assessment period.

In these embodiments, the investment damage score may be determined based at least on one of: a number of visitors to the fraudulent web resource, information about an average purchase amount associated with the brand 110 spent at the fraudulent web resource, and a conversion rate associated therewith.

According to some non-limiting embodiments of the present technology, determining the number of visitors to the fraudulent web resource may be based on data associated with the snapshot 302 and performed jointly both for search results 120 and for the contextual advertising 304.

The number of visitors to the fraudulent web resource may be determined as a sum of visitors to the fraudulent web resource over the assessment period. Further, the sum of visitors may be determined based on one of: a statistical number of transitions to a position of the fraudulent web resource within the search results 120 and a number of search queries associated with the fraudulent website.

According to some non-limiting embodiments of the present technology, the statistical number of transitions to the position of the fraudulent web resource within the search results 120 may be calculated according to the formula:

$$y = \text{CONST}_1 x^{-\text{CONST}_2}, \quad (2)$$

where y is the conversion rate associated with the fraudulent web resource, x is the position of the fraudulent web resource within search results 120, and $\text{CONST}_1$ and $\text{CONST}_2$ are constant values determined based on the information indicative of the brand 110 and data indicative of a probability of click associated with the position of the fraudulent web resource obtained from the search system over the assessment period.

It should be noted that the data indicative of the probability of click (represented, for example, by a Click-through Rate, CTR) associated with the fraudulent web resource may indicate that the higher the position of the fraudulent resource within the search results 120, the greater the number of visitors thereto is, and vice versa (see searchenginewatch.com/2012/08/23/organic-vs-paid-search-results-organic-wins-94-of-time).

In addition, the CTR may be indicative of a category of a given search query, such as branded or non-branded. For example, it may be demonstrated that in case of a non-branded search query, an average CTR of a top search result is around 48%, that of a second search result is around 12%, that of a third search result is around 8%; and around 32% may be distributed amongst remaining search results in a set of search results (such as the search results 120). In case of a branded search query, the respective values of the average CTR may be distributed as follows: 80% for the top search result; 6% for the second search result; 4% for the third search result; and 10% for the remaining search results.

According to some non-limiting embodiments of the present technology, the conversion rate may be determined based on averaged data publicly available from one or more search engine systems.

Further, a number of visitors to the fraudulent web resource through the search results 120 may also be determined based on averaged data publicly available from one or more search engine systems.

Similarly, a number of visitors to the fraudulent web resource through the contextual advertising 304 may be determined based on open source data on clicks on contextual advertising (such as WordStream™, and the like).

In some non-limiting embodiments of the present technology, the data indicative of the conversion rate associated with the fraudulent web resource and the position thereof within the search results 120 may be obtained from the internal database of the computer system 130, wherein they have been saved at step 202 of the method 200.

In other non-limiting embodiments of the present technology, the data indicative of the conversion rate associated with the fraudulent web resource may be available from an access counter present at the fraudulent website.

Further, the average purchase amount associated with the brand 110 at the fraudulent web resource and the data indicative of the conversion rate thereof may be extracted from the internal database for calculation of the investment damage score.

Moreover, in some non-limiting embodiments of the present technology, if the above data is unknown, the average values thereof may be obtained from open sources (for example, available at smartinsights.com/wp-content/uploads/2017/08/Average-lead-generation-rates-by-industry-2017.png).

According to some non-limiting embodiments of the present technology, the investment damage score may be calculated for each of the fraudulent web resource based on all previously obtained data by multiplying the number of visitors to the fraudulent web resource, the conversion rate associated therewith (determined in accordance with the Equation 2, for example), and the average purchase amount spent on products associated with the brand 110 at the fraudulent web resource.

Finally, the investment damage scores so determined for the fraudulent web resource may be saved in the internal database.

The method thus advances to step 214.

Step 214: Causing Execution of a Brand Protection Measure Against the Fraudulent Website in Accordance with the Investment Damage Score At step 214, the computer system 130 may be configured to rank the fraudulent web resource according to the investment damage score among other so identified fraudulent web resources; and further order them in a descending order of their associated ranks, thereby forming a priority list of fraudulent web resources. In the priority list, the fraudulent web resource is assigned a highest priority if the investment damage score associated therewith is greatest amongst those associated with others of the priority list of fraudulent web resources.

Accordingly, the fraudulent web resource of the highest priority may pose a greatest damage to the brand 110.

Finally, according to the non-limiting embodiments of the present technology, the computer system 130 may be configured to execute one or more brand protection measures. In these embodiments, the one or more brand protection measures may include at least one of:

blocking the fraudulent web resource;

reducing the traffic to the fraudulent web resource;
removing the fraudulent web resource from the set of search results;
adding the fraudulent web resource into a database of fraudulent resources;
accumulating evidence of fraudulent activities associated with the fraudulent web resource;
identifying web resources affiliated with the fraudulent web resource;
legal influence on the fraudulent web resource, including influence on its owner;
notifying customers and/or potential customers about the fraudulent web resource; and
identifying affiliation of the fraudulent web resource with previously identified fraudulent web resources.

It is contemplated that the execution of the one or more brand protection measures may vary depending on the brand 110, its specifics, location, etc.

Further, the one or more brand protection measures may be selected by representatives of the brand 110 or by experts in the relevant field.

Finally, the one or more brand protection measures may be determined by the computer system 130 according to specific rules defined based on the experience accumulated therein. For example, the one or more brand protection measures may vary depending on a brand field of the brand 110, a range associated with the calculated investment damage score, country, possibilities of executing a specific brand protection measure for the brand 110, statistics of satisfaction of the owner of the brand 110 with respect to the a given brand protection measure, etc.

The method 200 hence terminates.

It is contemplated that the computer system 130 may comprise a computing environment (not depicted) suitable for executing certain non-limiting embodiments of the present technology. The computing environment may typically include a general purpose computer or a special purpose device, such as a portable PC, a laptop, a tablet PC or a communication device. Certain details of such devices, such as processor, memory, data storage, cloud storage, display, etc. may be left out for clarity. A component, such as processor or memory, to which one or several tasks or functions are assigned, may be a general component temporarily configured to execute a specific task or function or a specific component designed specifically for the task or the function. The term "processor" used here denotes one or several electronic circuits, devices, chips, processing cores and/or other components configured to process data and/or software code.

Data structures and software code mentioned in this description are usually stored on a durable machine-readable medium, which can be any device or media capable of storing code and/or data to be used by the computer system 130. Machine-readable storage medium including, without limitation, nonvolatile or volatile memory, electrical, magnetic and optical memory devices, such as disc drives, magnetic tape, CDs, DVDs (digital versatile disks or digital video disks), solid state drives and/or other computer-readable media currently known or developed in the future.

Methods and processes detailed in the description may be embodied in a code and/or data, which may be stored on a machine-readable medium, as described above. When a process or a computer system reads and executes the code and manipulates the data stored on the medium, the processor or computer system executes the methods and processes embodied in data, code structures, and stored on the medium.

Moreover, methods and processes may be programmed in hardware modules, including, without limitation, application specific integrated circuits (ASIC), field-programmable gate arrays (FPGA) and other programmable logic devices known currently or developed in the future; when such module is activated, it executes methods and processing included in the module.

Embodiments mentioned above are presented only for illustrative and descriptive purposes. They are not intended to be exhaustive or limit this disclosure by disclosed forms. Therefore, many modifications and options may become apparent to specialists skilled in the art of the present technology. The scope of the present technology is limited only to the accompanying claims, and not by the above-presented disclosure.

The invention claimed is:

1. A method of reducing access to a web resource, the method being executable by a computing device, the method comprising:
receiving an information indicative of a brand to be protected;
accessing a search system database to identify a set of most popular search queries associated with the brand in the search system database, the set of most popular search queries being indicative of past queries submitted to an electronic search system associated with the search system database;
acquiring a set of search results for at least one of the set of most popular search queries, the set of search results having been generated over a pre-determined assessment period;
calculating a harmfulness coefficient for at least one website contained in the set of search results;
identifying the at least one website having the harmfulness coefficient exceeding a threshold value and defining it as a fraudulent website;
generating an investment damage score for the fraudulent website over the pre-determined assessment period; and
causing execution of a brand protection measure against the fraudulent website in accordance with the investment damage score.

2. The method of claim 1, wherein identifying the set of most popular search queries further comprises analyzing search query statistics obtained from the electronic search system.

3. The method of claim 1, wherein the acquiring the set of search results further comprises taking a snapshot thereof, the snapshot being representative of snapshot data, the snapshot data including at least a rank value of the at least one website indicative of its position within the set of search results.

4. The method of claim 3, wherein the snapshot data of the set of search results is represented by a table containing at least, for the at least one website, the rank value, a link to the at least one website, a title and a description of the link, and information of the computing device, the information of the computing device including information of a location thereof.

5. The method of claim 4, wherein the snapshot data further includes data of contextual advertising associated with the set of search results acquired by at least one external remote computing device.

6. The method of claim 3, wherein the snapshot data further includes data of contextual advertising associated with the at least one of the set of most popular search queries.

7. The method of claim 1, wherein the harmfulness coefficient is calculated according to a formula:

$$R=1-\Pi_i(1-w_i),$$

where R is the harmfulness coefficient and $w_i$ is a weight associated with a respective one of a plurality of harmfulness indications associated with the at least one website.

8. The method of claim 7, wherein the plurality of harmfulness indications includes at least one of:
   a presence of a domain associated with the at least one website in a list of legitimate or illegitimate domains;
   a popularity value associated with the at least one website;
   a presence of the domain associated with the at least one website in a list of fraudulent domains;
   an absence of a security certificate;
   a life time of the domain associated with the website;
   data indicative of using of website builders for creating the at least one website;
   a number of webpages, which the at least one website includes;
   a presence, at the at least one website, of one of a web registration form and a web payment form;
   a category of an owner of the domain associated with the at least one website including one of: a private person, a legal entity, and hidden;
   a cost of hosting associated with the at least one website;
   a domain zone;
   a country associated with a hosting provider of the at least one website; and
   a relevance value associated with the at least one website.

9. The method of claim 1, wherein the investment damage score over the pre-determined assessment period is generated based on multiplying one of: an average purchase amount associated with the brand at the fraudulent website; a conversion rate associated with the fraudulent website, and a number of visitors to the fraudulent website over the pre-determined assessment period.

10. The method of claim 9, wherein a calculation of the number of visitors to the fraudulent website is based on the snapshot data, the calculation comprising summing visitors to the fraudulent website over the pre-determined assessment period.

11. The method of claim 10, wherein the summing the visitors to the fraudulent website is based on one of: a statistical number of transitions to a position of the fraudulent website in the set of search results and a number of search queries associated with the fraudulent website.

12. The method of claim 11, wherein the statistical number of transitions to the position of the fraudulent website in the set of search results is calculated based at least on one of:
   a formula: $y=CONST_1 x^{-CONST_2}$, where y is the conversion rate associated with the fraudulent website, x is the position of the fraudulent website in the set of search results, and $CONST_1$ and $CONST_2$ are constant values determined based on the information indicative of the brand and data indicative of a probability of click associated with the position of the fraudulent website obtained from the search system over the pre-determined assessment period; and
   data available from an access counter present at the fraudulent website.

13. The method of claim 1, wherein the execution of the brand protection measure includes:
   blocking the fraudulent website;
   reducing the traffic to the fraudulent website;
   removing the fraudulent website from the set of search results;
   adding the fraudulent website into a database of fraudulent resources;
   accumulating evidence of fraudulent activities associated with the fraudulent website;
   identifying web resources affiliated with the fraudulent website;
   legal influence on the fraudulent website, including legal influence on an owner associated therewith;
   notifying customers and/or potential customers about the fraudulent website; and
   identifying affiliation of the fraudulent website with previously identified fraudulent websites.

14. A system for reducing access to a web resource, the system comprising a computing device further comprising:
   a processor;
   a non-transitory computer-readable medium comprising instructions;
   the processor, upon executing the instructions, being configured to:
     receive and store information indicative of a brand to be protected;
     access a search system database to identify a set of most popular search queries associated with the brand in the search system database, the set of most popular search queries being indicative of past queries submitted to a search system associated with the search system database;
     acquire a set of search results for at least one of the set of most popular search queries, the set of search results generated over a pre-determined assessment period;
     calculate a harmfulness coefficient for at least one website contained in the set of search results;
     in response the harmfulness coefficient exceeding a threshold value, identify the at least one website as a fraudulent website;
     generate an investment damage score for the fraudulent website over the pre-determined assessment period; and
     cause execution of a brand protection measure against the fraudulent website in accordance with the investment damage score.

15. The system of claim 14, wherein the processor is configured to identify the set of most popular search queries based on analyzing search query statistics obtained from the search system.

16. The system of claim 14, the processor configured to acquire the set of search results is further configured to take a snapshot thereof, the snapshot being representative of snapshot data, the snapshot data including a rank value of the at least one website indicative of its position within the set of search results.

17. The system of claim 16, wherein the processor is configured to represent the snapshot data of the set of search results in a table containing at least, for the at least one website, the rank value, a link to the at least one website, a title and a description of the link, and information of the computing device, the information of the computing device including information of a location thereof.

18. The system of claim 17, wherein the processor is further configured to receive, from at least one external remote computing device, data of contextual advertising associated with the set of search results.

19. The system of claim 16, wherein the processor is further configured to receive data of contextual advertising associated with the at least one of the set of most popular search queries.

20. The system of claim 14, wherein the processor is configured to calculate the harmfulness coefficient according to a formula:

$$R = 1 - \Pi_i(1 - w_i),$$

where R is the harmfulness coefficient and $w_i$ is a weight associated with a respective one of a plurality of harmfulness indications associated with the at least one website.

21. The system of claim 14, wherein the plurality of harmfulness indications includes at least one of:
   a presence of a domain associated with the at least one website in a list of legal/illegal domains;
   a popularity value associated with the at least one website;
   a presence of the domain associated with the at least one website in a list of fraudulent domains;
   an absence of a security certificate;
   a life time of the domain associated with the website;
   data indicative of using of website builders for creating the at least one website;
   a number of webpages, which the at least one website includes;
   a presence, at the at least one website, of one of a web registration form and a web payment form;
   a category of an owner of the domain associated with the at least one website including one of: a private person, a legal entity, hidden;
   a cost of hosting associated with the at least one website;
   a domain zone;
   a country associated with a hosting provider of the at least one website; and
   a relevance value associated with the at least one website.

22. The system of claim 14, wherein the processor is configured to generate the investment damage score by multiplying one of: an average purchase amount associated with the brand at the fraudulent website; a conversion rate associated with the fraudulent web site, and a number of visitors to the fraudulent website over the pre-determined assessment period.

23. The system of claim 22, wherein the processor is configured to calculate of the number of visitors to the fraudulent website based on the snapshot data, the calculating comprising summing visitors of the fraudulent website over the pre-determined assessment period.

24. The system of claim 23, wherein the summing the visitors to the fraudulent website is based on one of: a statistical number of transitions to a position of the fraudulent website in the set of search results and a number of search queries associated with fraudulent website.

25. The system of claim 22, wherein the statistical number of transitions to the position of the fraudulent website in the set of search results is calculated based at least on one of:
   a formula: $y = \text{CONST}_1 x^{-\text{CONST}_2}$, where y is the conversion rate associated with the fraudulent website, x is the position of the fraudulent website in the set of search results, and $\text{CONST}_1$ and $\text{CONST}_2$ are constant values determined based on the information indicative of the brand and data indicative of a probability of click associated with the position of the fraudulent website obtained from the search system over the pre-determined assessment period; and
   data available from an access counter present at the fraudulent website.

26. The system of claim 14, wherein, in order to cause execution of the brand protection measure, the processor is configured to execute at least one of:
   blocking the fraudulent website;
   reducing the traffic to the fraudulent website;
   removing the fraudulent website from the set of search results;
   adding the fraudulent website into a database of fraudulent resources;
   accumulating evidence of fraudulent activities associated with the fraudulent website;
   identifying web resources affiliated with the fraudulent website;
   legal influence on the fraudulent website, including influence on its owner;
   notifying customers and/or potential customers about the fraudulent website; and
   identifying affiliation of the fraudulent website with previously identified fraudulent websites.

* * * * *